UNITED STATES PATENT OFFICE.

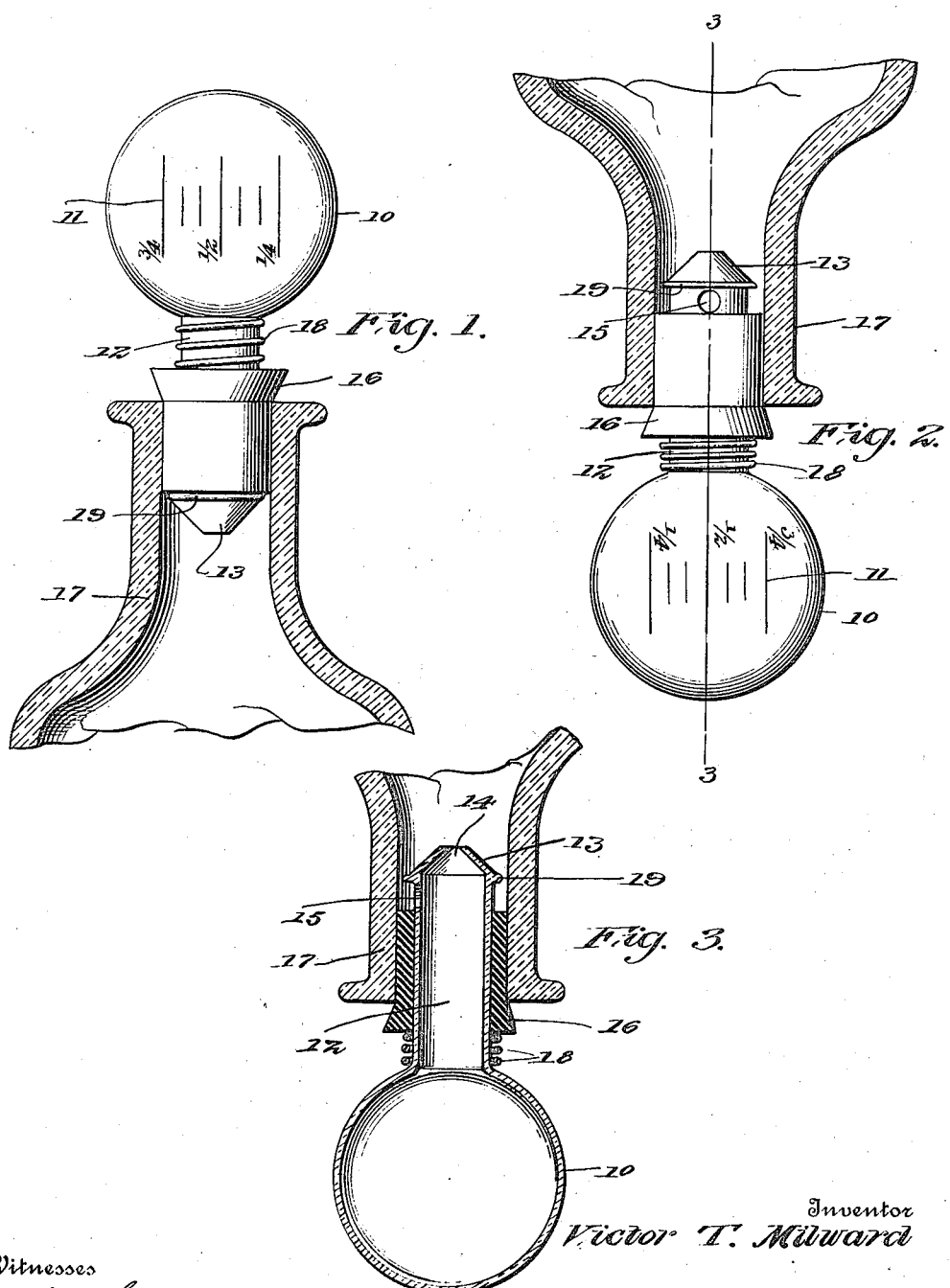

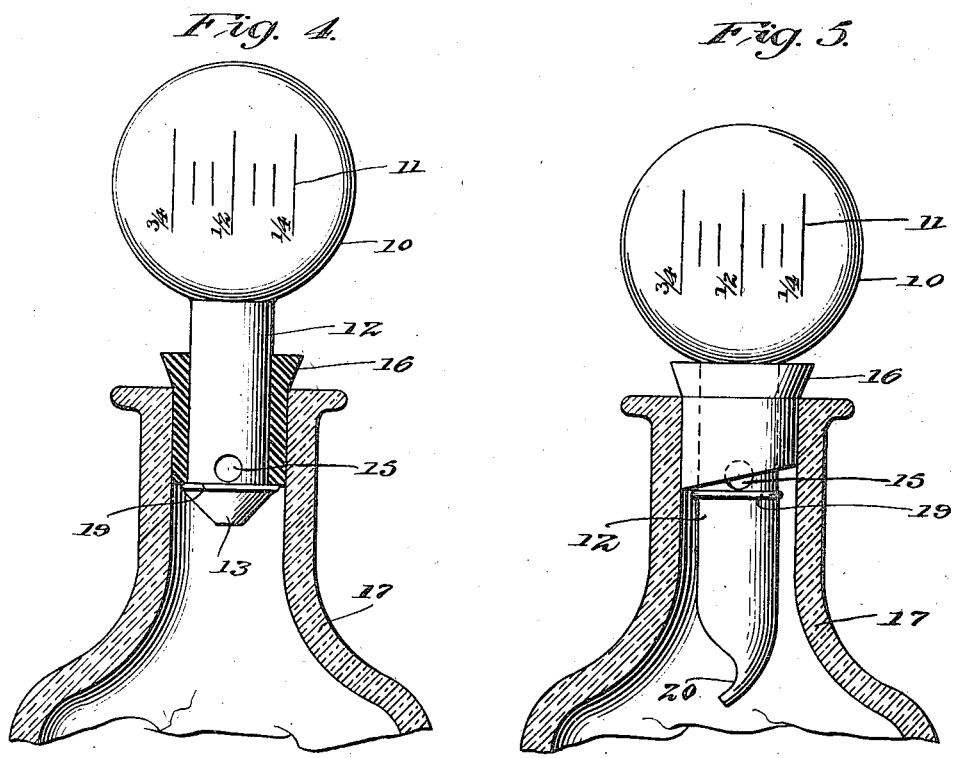

VICTOR T. MILWARD, OF DAYTON, WYOMING.

MEASURING DEVICE.

1,153,810.  Specification of Letters Patent.  Patented Sept. 14, 1915.

Application filed August 4, 1914.  Serial No. 855,021.

*To all whom it may concern:*

Be it known that I, VICTOR T. MILWARD, a citizen of the United States, residing at Dayton, in the county of Sheridan and State of Wyoming, have invented new and useful Improvements in Measuring Devices, of which the following is a specification.

The invention relates to measuring devices, and more particularly to that class of measuring devices for use in measuring out fluids and the like from suitable receptacles in which they are contained, and the invention contemplates, among other features, the provision of a simple device which can be used in connection with a bottle or similar receptacle for the purpose of measuring out a predetermined amount of the fluid in the bottle, the device being also adaptable to be used as a stopper for the bottle when the device is not in use.

The invention still further contemplates the provision of a device which can be used in the nature of a dropper such as a medicine dropper and which is particularly adaptable for use in measuring out quantities of medicine, the device being so arranged and constructed that the fluid, when measured out by the device, can be administered to a patient more easily than with the use of an ordinary spoon for the reason that the patient can remain in a reclining position to receive the medicine and which can be given to the patient in small quantities or in a steady stream.

In the further disclosure of the invention reference is to be had to the accompanying drawings, constituting a part of this specification, in which similar characters of reference denote corresponding parts in all the views, and in which:

Figure 1 is a side elevation of the device, showing the same applied to a bottle, the device being in normal position to constitute a stopper for the bottle and the bottle being shown in section; Fig. 2 is a similar view showing the device ready to be filled with fluid from the bottle; Fig. 3 is a vertical transverse sectional view taken on the line 3—3 in Fig. 2; Fig. 4 is a side elevation of a modified form of device, and in which instance the spring is dispensed with; and Fig. 5 is a side elevation of another modified form of my device.

Referring more particularly to the views, I provide a preferably spherical measuring container 10 having on its surface suitable graduations 11, said container 10 being preferably made of glass so as to be transparent to permit of the user readily discerning the amount of fluid to be admitted to the container. The container has a tubular shank 12 which is also preferably made of glass, said shank having a spout 13 and forming a passage 14 to and from the container 10, as will be hereinafter more fully disclosed. The shank 12 also has a side opening 15 and the shank is arranged to slide and extend through a member 16 which is preferably tapered and shaped somewhat similar to a cork so that the member 16 can be applied to a bottle or other receptacle 17 and constitute a stopper or cork therefor, as shown. A helical expansible spring 18 encircles the shank 12, with one end of the spring abutting against the member 16 and the other end abutting against the spherical container 10. Now it will be apparent that when the device described is applied to the bottle 17 as shown, the spring 18 will normally hold the shank 12 in its uppermost position on the member 16 so that the said member will constitute a closure for the opening 15 in the shank, the upward movement of the shank being limited by an annular bead 19 formed adjacent to the spout 13 and at the inner end thereof.

When it is desired to fill or partially fill the container 10 with a predetermined amount of fluid the bottle, after having the measuring device applied thereto as mentioned, is partially or entirely inverted and a pressure is then exerted on the container to move the same against the action of the spring 18, thus causing the shank 12 to be advanced into the bottle or receptacle to uncover the opening 15 and which, upon being uncovered, will permit the fluid in the bottle or receptacle to enter the spout 13 and pass into the container, the uncovering of the opening 15 being adapted to permit the air in the container to be exhausted therefrom as the fluid enters the shank and the container. Now it will be apparent that at the moment the pressure on the container is released the action of the spring will cause the shank to return to normal position with respect to the member 16, thus closing the opening 15 and cutting off the admittance of fluid to the container, and it will be clear that by carefully adjusting the shank with respect to the member 16, the uncovering of the opening can be regulated by the operator so that the amount of fluid to be admitted to the container from the bottle or receptacle can also be regulated, particularly in conjunction with the graduations 11 on the container. When the container has been filled with the desired amount of fluid, it can be removed from the bottle and then used in the same manner as a dropper for medicine, it being clear that the fluid contained in the container will not flow through the shank and spout until the opening 15 is uncovered to permit the entrance of air into the container. Thus in permitting the fluid in the container to flow therefrom, the flow of the fluid will be regulated so that in the instance of administering medicine to a patient, and which medicine is contained in the container, the medicine can be administered in drops or in a steady stream at the will of the operator.

In Fig. 4 I disclose a modified form of my device and in which instance I show precisely the same construction as set forth heretofore, with the exception that the spring 18 is dispensed with and the sliding engagement of the shank 12 with the member 16 is such that the shank will be retained in frictional engagement and contact with the member, thereby permitting the shank to be advanced or retreated relatively to the member at the will of the operator for the purpose of covering or uncovering the opening 15, the member 16 in this instance being adapted to fit closely around the shank to hold the same against movement when a push or pull is not applied to the container.

In Fig. 5 I disclose another modified form of my device and in which instance the spout 13 of the container is preferably elongated and terminates in a restricted nozzle 20 having the shape and configuration of a medicine dropper so that the device can be more conveniently and accurately handled to administer medicine to a patient.

As mentioned heretofore, the device, when not in use, constitutes an effective stopper or cork for a bottle or a receptacle and when used affords a convenient means for measuring out a quantity of fluid.

The container can be made in any size and when used in connection with poisonous medicines or the like the size of the container will be preferably proportionate to the dose of medicine so that when the container is completely full of the medicine and the medicine is subsequently administered from the container it will not result in an overdose to the patient. The member 16 can be made of cork, rubber or glass and although I have mentioned the various parts of the device as being made of particular materials, it will be understood that I do not limit myself to the specific form of material from which the device or parts thereof can be made; that various changes may be made from the structure disclosed in the drawings without departing from the spirit of the invention and that the scope of the invention is defined by the appended claim.

Having thus described my invention, I claim:

As a new article of manufacture, a measuring device comprising a sleeve-like member, a tubular shank extending through the sleeve-like member and in sliding relation thereto, said tubular member having one end closed and the other end open and provided with an opening a distance from its open end, said opening being formed in the side wall of the shank, a bead on the shank and lying between the open end thereof and said opening, with said bead adapted to abut against the inner end of the sleeve-like member to limit the sliding movement of the shank upon the member in one direction, a transparent bulb-like member on the open end of the shank, and a spring encircling the shank, with one end bearing against the transparent bulb-like member and the other end bearing against the sleeve-like member to normally hold the shank with relation to the sleeve-like member so that the opening in the shank will be closed by the sleeve-like member.

In testimony whereof I affix my signature in presence of two witnesses.

VICTOR T. MILWARD.

Witnesses:
 GEORGE MILWARD,
 MANFORD M. OWEN.